United States Patent
Gerami et al.

(10) Patent No.: US 9,014,696 B1
(45) Date of Patent: Apr. 21, 2015

(54) SYSTEM AND METHOD FOR PRIORITY WIRELESS ACCESS

(75) Inventors: Shervin Gerami, Ashburn, VA (US); Gerard Tumelty, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 2731 days.

(21) Appl. No.: 11/337,672

(22) Filed: Jan. 24, 2006

(51) Int. Cl.
*H04W 4/00* (2009.01)
*H04W 74/04* (2009.01)

(52) U.S. Cl.
CPC ................................ *H04W 74/04* (2013.01)

(58) Field of Classification Search
USPC ............... 455/404.1, 404.2, 3.01, 403, 422.1, 455/432.1–435.3, 512, 513, 452.1, 450; 370/444, 338, 465; 340/7.42
See application file for complete search history.

(56) References Cited

U.S. PATENT DOCUMENTS

| | | | |
|---|---|---|---|
| 4,534,061 A * | 8/1985 | Ulug | ............................... 455/17 |
| 5,025,254 A | 6/1991 | Hess | |
| 5,081,671 A | 1/1992 | Raith et al. | |
| 5,574,977 A | 11/1996 | Joseph et al. | |
| 5,740,533 A | 4/1998 | Lin | |
| 5,809,421 A * | 9/1998 | Manssen et al. | ............... 455/434 |
| 6,243,393 B1 * | 6/2001 | Fitzgerald | ..................... 370/465 |
| 6,356,767 B2 * | 3/2002 | Froula | ............................ 455/512 |
| 6,665,534 B1 * | 12/2003 | Conklin et al. | ............... 455/417 |
| 6,973,094 B1 * | 12/2005 | Holloway et al. | ............. 370/445 |
| 2002/0037715 A1 * | 3/2002 | Mauney et al. | ................ 455/421 |
| 2002/0065082 A1 * | 5/2002 | Yegani et al. | ................. 455/452 |
| 2002/0077141 A1 * | 6/2002 | Hwang et al. | ................. 455/522 |
| 2004/0029592 A1 * | 2/2004 | Shyy et al. | ..................... 455/453 |
| 2004/0248573 A1 * | 12/2004 | Wandel | ...................... 455/435.1 |
| 2005/0143123 A1 * | 6/2005 | Black et al. | ................ 455/552.1 |
| 2005/0243754 A1 * | 11/2005 | Saeed et al. | ................... 370/328 |
| 2006/0035661 A1 * | 2/2006 | Niwano et al. | ................ 455/522 |
| 2006/0084442 A1 * | 4/2006 | Kotzin et al. | ................. 455/445 |
| 2006/0111104 A1 * | 5/2006 | Hyslop | ...................... 455/435.1 |
| 2006/0223491 A1 * | 10/2006 | Freeburg | .................... 455/404.1 |

* cited by examiner

Primary Examiner — Mahendra Patel

(57) ABSTRACT

Systems and methods for priority wireless communications are provided. When a priority mobile station is registered with a wireless communication network, one or more base stations can establish a priority control channel for serving the priority mobile station. The priority control channel can be an uplink control channel for sending call setup requests, such as traffic channel allocations. The priority control channel can also be a downlink control channel for sending information to priority mobile stations.

21 Claims, 4 Drawing Sheets

SYSTEM AND METHOD FOR PRIORITY WIRELESS ACCESS

BACKGROUND OF THE INVENTION

The mobility afforded by wireless communication networks has resulted in increased usage of such networks. Private wireless networks and cellular networks are two common types of wireless communication networks. Private wireless networks, also known as wireless local loop (WLL) networks, are commonly operated by public safety agencies, taxi services and delivery services. Private wireless networks typically operate over a limited range of frequencies and within limited geographic areas. In contrast, cellular networks typically operate over a larger number of frequencies and provide coverage over larger geographic areas.

Although conventional cellular networks may provide sufficient reliability for the average user, there are a number of deficiencies which prevent widespread adoption by public safety agencies. For wireline communication, public safety agencies can be provided with dedicated circuits and switches such that even when the Public Switched Telephone Network (PSTN) is overloaded with non-emergency traffic, communications between, and within, public safety agencies can still be completed. To provide reliability to wireless communications, public safety agencies typically employ private wireless networks which operate over frequencies reserved for public safety agencies.

Although these private radio networks reduce the likelihood that calls by public safety agencies are blocked from accessing the radio network, they are expensive to implement and maintain. For example, these networks typically require the use of specialized mobile stations which are more expensive than typical mobile stations, due to the relatively low demand for the specialized mobile stations compared to that of mass-produced mobile stations. As used herein, the term mobile station is intended to encompass any type of wireless communication device including wireless telephones, wireless Personal Digital Assistants (PDA), wireless pagers, portable computers with wireless modems and the like. Compared to cellular networks, private wireless networks are more likely to have dead spots where a radio signal cannot be received by the public safety agency worker's mobile station. These dead spots can be extremely hazardous to the public safety agency workers, e.g., a police officer requesting backup, and to the citizenry in general, e.g., a public safety agency worker requesting an ambulance or fire trucks.

One solution currently employed by cellular network operators to encourage use of their networks by public safety agencies is to provide public safety agencies priority access to traffic channels. This typically involves mobile stations used by public safety agencies transmitting a priority indication to the cellular network during a traffic channel request. The cellular network recognizes the priority indication and will grant the public safety agency worker's mobile station access to the first available traffic channel. In some cellular networks when there are no available traffic channels, the cellular network will drop an existing call to make available a traffic channel for the public safety agency worker.

Although these conventional techniques provide public safety agency workers with priority access to traffic channels, they do not address the ability of the public safety agency worker to request access to the traffic channels during periods of congestion on the network. Accordingly, it would be desirable to provide methods and systems for reducing the time, and increasing the likelihood that, traffic channels are granted to public safety agency workers and/or other priority users.

SUMMARY OF THE INVENTION

Systems and methods for priority wireless communications are provided. In accordance with exemplary embodiments of the present invention, when a priority mobile station registers in a wireless communication network, one or more base stations establish a priority control channel. The priority control channel can include an uplink control channel and/or a downlink control channel. If desired, an additional condition for establishing the priority control channel can be whether the regular control channels are congested.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
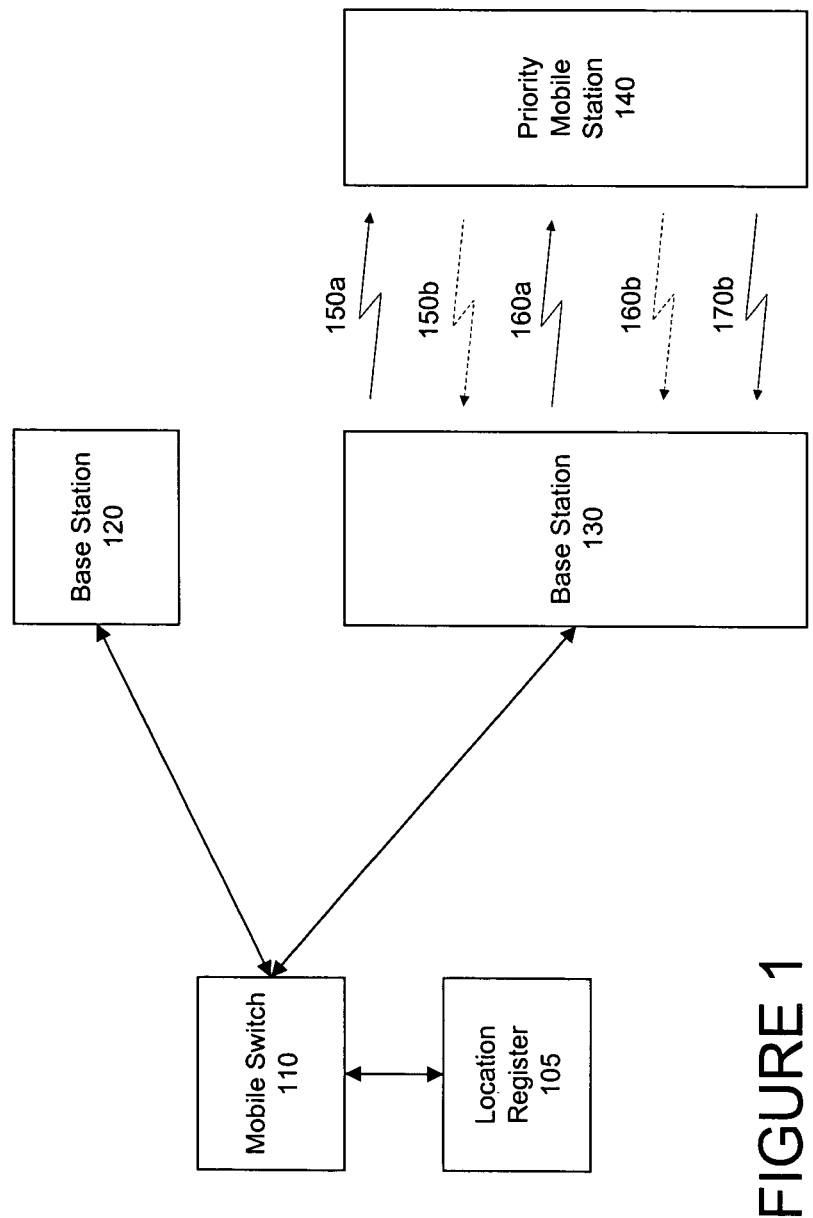
FIG. 1 is a block diagram illustrating an exemplary wireless communication network in accordance with the present invention.

FIG. 1 is a block diagram illustrating an exemplary wireless communication network in accordance with the present invention. The wireless communication network includes a location register 105 (such as a visitor location register and/or a home location register), mobile switch 110 (such as a mobile switching center (MSC)), one or more base stations 120 and 130, and one or more priority mobile stations 140. In accordance with exemplary embodiments of the present invention, a priority mobile station is one that is granted priority access to the wireless communication network. The priority access can be granted because the user of the priority mobile station is a member of a public safety organization, such as the fire and police departments, or because the user pays additional fees for priority access. In conventional wireless communication networks, a base station, such as base station 130, broadcasts a primary control channel 150a and secondary control channel 160a in the downlink direction. When a mobile station desires to initiate a call, the mobile station will access a primary control channel 150b or secondary control channel 160b in the uplink direction.

In some networks call requests, such as requests for a traffic channel allocation, are performed according to a slotted ALOHA scheme. As is well known in the art, a slotted ALOHA scheme involves mobile stations sending their requests at particular time periods, i.e., time slots. However, the time slots are not reserved for particular mobile stations. Accordingly, a collision will occur when more than one mobile station attempts to access the uplink control channel during a particular time slot, and the call requests will not be received by the base station. When requests for access using a slotted ALOHA scheme exceed 18% of the available time slots, there are a large amount of collisions, which severely limits the number of requests received by the base station. In emergency situations the 18% threshold is often exceeded, thereby limiting access to the network. This limited access is particularly problematic for public safety personnel, who need to access the network to coordinate a response to an emergency.

The present invention addresses the above-identified and other deficiencies of conventional networks by providing a priority control channel. As will be described in more detail below, priority information for mobile stations can be stored in location register 105. When a mobile station registers with the network, and the network determines that the mobile station is a priority mobile station using the information stored in the location register, the network provides a priority control channel. As illustrated in FIG. 1, a priority mobile station 140 can send a call request to the base station over priority control channel 170*b*. If desired, the network can also provide a downlink priority control channel (not illustrated). The call request can be for dispatch communications, interconnect communications or packet data communications. Because the number of mobile stations designated as priority mobile stations will be less than the total number of mobile stations attempting to access the network over regular control channels, there will be less contention between these priority mobile stations when accessing the priority control channel and a greater likelihood of success in obtaining a traffic channel allocation.

The identification of the priority control channel can be provided by the primary or secondary control channels. In a Code Division Multiple Access (CDMA) network the identification can be the identification of a spreading code, in an Orthogonal Division Frequency Multiple Access (OFDMA) network the identification can be the identification of one or more tones, in Frequency Division Multiple Access (FDMA) network the identification can be the identification of a particular frequency, and in a Time Division Multiple Access (TDMA) network the identification can be the identification of a particular frequency and/or time slot.

Figure 2:
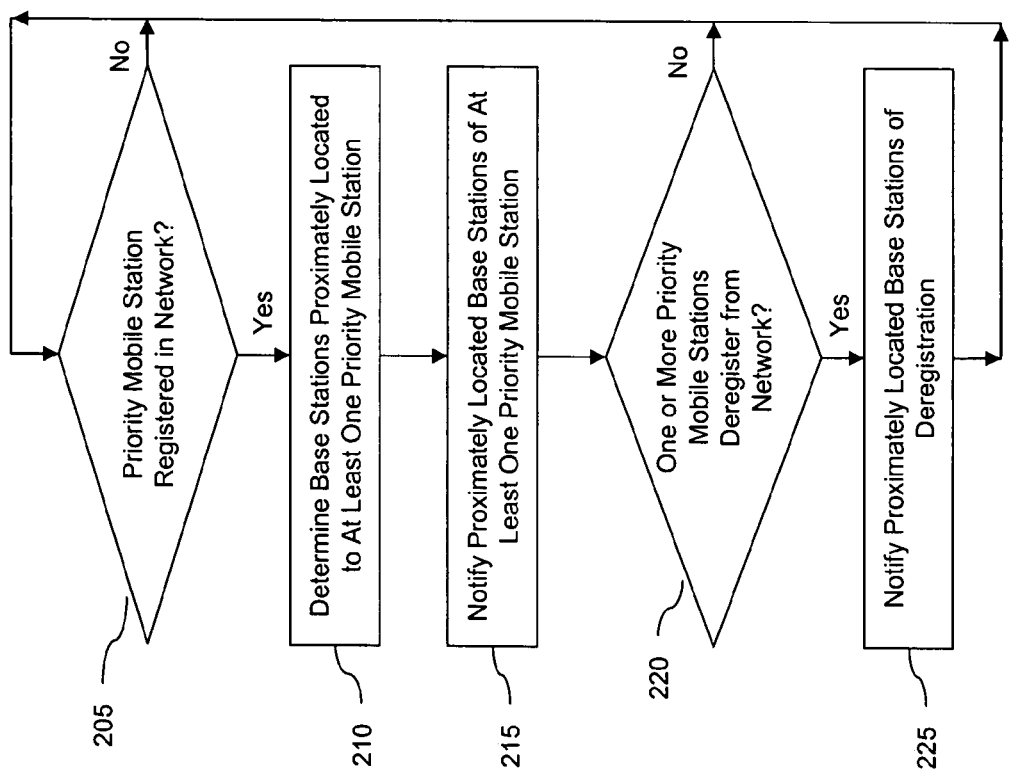
FIG. 2 is a flow diagram illustrating an exemplary method for a wireless communication network in accordance with the present invention.

FIG. 2 is a flow diagram illustrating an exemplary method for a wireless communication network in accordance with the present invention. This method can be performed in a mobile switch, mobile switching office, or any other entity in a wireless communication network that can communicate, either directly or indirectly, with one or more base stations. Initially, the network determines whether a priority mobile station is registered in the network (step 205). Whether a mobile station is a priority mobile station can be determined using an explicit indicator received from a mobile station during a registration procedure, or based upon information stored in the mobile station's location register database entry. When a priority mobile station is registered in the network ("Yes" path out of decision step 205), then the network determines the base stations that are proximately located to the priority mobile station (step 210). The network then notifies the proximately located base stations of the registration of one or more priority mobile stations (step 215). If desired, only the base station currently supporting the priority mobile station can be notified and the notification of proximately located base stations can be omitted.

When one or more of the priority mobile stations deregister from the network ("Yes" path out of decision step 220), then the network notifies the base stations proximately located to the deregistered mobile stations (step 225). Deregistration can either be based on an affirmative deregistration, for example due to a priority mobile station moving out of an area of a base station, or the failure of the priority mobile station to inform the network of its' current location for a predetermined amount of time.

Figure 3:
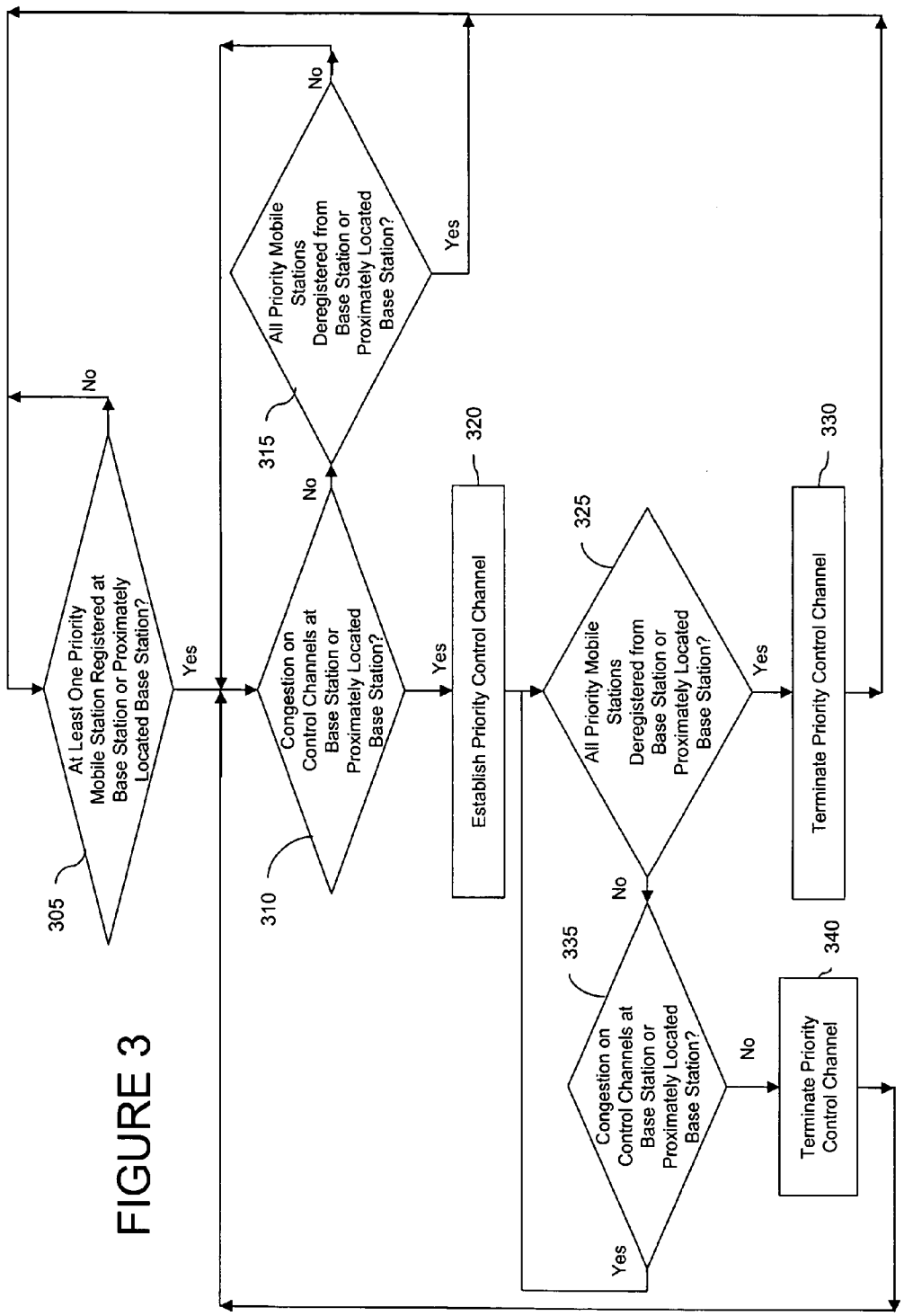
FIG. 3 is a flow diagram of an exemplary method for base station in accordance with the present invention.

FIG. 3 is a flow diagram of an exemplary method for base station in accordance with the present invention. Initially, a base station determines whether at least one priority mobile station is registered at the base station or at a proximately located base station (step 305). This determination can be based upon messages received from a priority mobile station, e.g., a registration request, and/or messages received from the mobile switch or other base stations. When the base station determines that at least one priority mobile station has registered at the base station or a proximately located base station ("Yes" path out of decision step 305), then the base station determines whether there is congestion on control channels at the base station or proximately located base stations (step 310). The congestion can be on uplink and/or downlink control channels. Congestion of the control channels can be determined by various mechanisms. For example, on an uplink control channel congestion can be determined by identifying collisions occurring due to a number of mobile stations requesting access during particular time slots. The collisions can be determined by recognizing interference occurring during these time slots and the base station not receiving any messages from mobile stations during the time slots.

When there is no congestion on control channels at the base station or proximately located base stations ("No" path out of decision step 310), then the base station determines whether all priority mobile stations have deregistered from the base station or proximately located base stations (step 315). When all priority mobile stations have deregistered from the base station or proximately located base stations ("Yes" path out of decision step 315), then the base station determines whether at least one priority mobile station is registered at the base station or proximately located base stations (step 305). However, when priority mobile stations are still registered at the base station or proximately located base stations ("No" path out of decision step 315), then the base station continues to determine whether there is congestion on control channels at the base station or proximately located base stations (step 310).

When the base station determines that there is congestion on the control channels of the base station or proximately located base stations ("Yes" path out of decision step 310), then the base station establishes a priority control channel (step 320). The priority control channel can be established in the downlink direction by broadcasting the priority control channel, and the priority control channel can be established in the uplink direction by broadcasting an identification of the priority control channel to priority mobile stations in a downlink control channel.

The base station then determines whether all priority mobile stations have deregistered from the base station or proximately located base stations (step 325). When the base station determines that all priority mobile stations have deregistered from the base station or proximately located base stations ("Yes" path out of decision step 325), then the base station terminates the priority control channel (step 330). Termination of the priority control channel can involve ceasing to broadcast an identification of an uplink control channel and/or ceasing the broadcasting of a downlink control channel.

When priority mobile stations are still registered at the base station or proximately located base stations ("No" path out of decision step 325), then the base station continues to determine whether there is congestion on uplink control channels at the base station or proximately located base stations (step 335). When there continues to be congestion on the control channels at the base station or proximately located base stations ("Yes" path out of decision step 335), then the base station continues to monitor the registration status of the priority mobile stations (step 325).

When the base station determines that there is no longer congestion on uplink control channels at the base station or proximately located base stations ("No" path out of decision step 335), then the base station terminates the priority control channel (step 340). The base station then determines whether there is congestion on the uplink control channels at the base station or proximately located base stations (step 310).

Although the method of FIG. 3 has been described above where priority control channels are created only when there is congestion on other control channels, this step may be omitted. In this case the priority control channels will be established whenever there is one or more priority mobile stations registered at a base station or a proximately located base station. Moreover, the method of FIG. 3 is described as establishing a priority control channel when a mobile station is registered at proximately located base stations. This allows a priority mobile station to handoff to one of the proximately located base stations. However, if desired, the priority control channel can be established only at base stations where priority mobile stations are registered.

Figure 4:
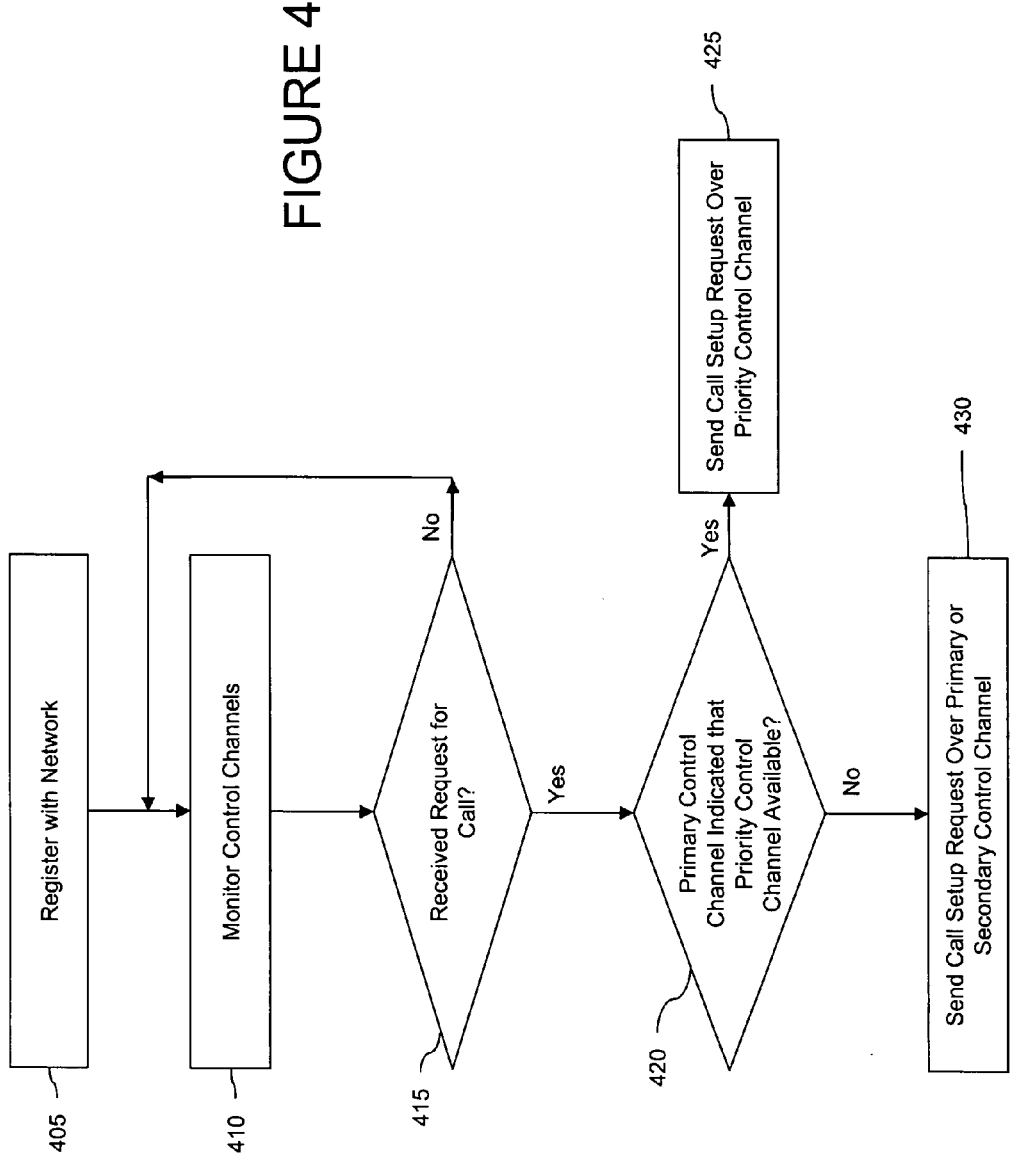
FIG. 4 is a flow diagram of an exemplary method for a mobile station in accordance with the present invention.

FIG. 4 is a flow diagram of an exemplary method for a priority mobile station in accordance with the present invention. Initially, the mobile station registers with the network (step 405). The registration can include an explicit indication of the priority status of the mobile station. Alternatively, or additionally, the priority status can be determined within the network based on an identifier of the mobile stations being included on a priority list or information included in the mobile station's location register database entry, such as a flag. The mobile station identifier can be a mobile station identification (MSID), temporary mobile station identifier (TMSI), international mobile station identifier (IMSI), international mobile station equipment identifier (MEI), urban-fleet-mobile station identifier (UFMI), internet protocol (IP) address and/or the like.

The mobile station monitors control channels (step 410), such as the primary, secondary and/or priority downlink control channels, and determines whether it has received a request to establish a call (step 415). When the mobile station has not received a request to establish a call ("No" path out of decision step 415), then the mobile station continues to monitor the control channels (step 410).

When the mobile station receives a request to establish a call ("Yes" path out of decision step 415), then the mobile station determines, based on information obtained while monitoring the control channels, whether the primary control channel indicated that a priority control channel is available (step 420). When the mobile station determines that a priority control channel is available ("Yes" path out of decision step 420), then the mobile station sends a call setup request, such as a traffic channel allocation request, over the priority control channel (step 425). If, however, the mobile station determines that a priority control channel is not available ("No" path out of decision step 420), then the mobile station sends a call setup request over either the primary or secondary uplink control channels (step 430). Although not illustrated in FIG. 4, while the mobile station monitors the primary, secondary and/or priority control channels, the mobile station may receive an incoming call setup request.

The present invention can also be combined with other types of priority access techniques. For example, some mobile stations can be provided with higher priority than others, and the higher priority mobile stations can be given priority over other mobile stations in traffic channel allocation. Although exemplary embodiments have been described above in connection with particular multiple access protocols, the present invention is equally applicable to any multiple access protocol that employs any form of a Layer 3 control channel.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing priority access to a wireless communication network, the method comprising the acts of:
   broadcasting, by the base station, a primary and secondary control channel; and
   determining that a priority mobile station is registered in the wireless communication network;
   wherein when it is determined that the priority mobile station is registered in the wireless communication network the method further comprises
      establishing a priority control channel that is separate and distinct from the primary and secondary control channels; and
      broadcasting an identification of the priority control channel.

2. The method of claim 1, wherein the priority control channel includes an uplink channel.

3. The method of claim 2, wherein the uplink channel is a traffic channel allocation request channel.

4. The method of claim 3, wherein the priority control channel further includes a downlink control channel.

5. The method of claim 1, wherein the priority control channel is established by a base station located in proximity to a location of where the priority mobile station registers.

6. The method of claim 5,
   wherein the identification of the priority control channel is broadcast over the primary control channel.

7. The method of claim 1, further comprising the acts of:
   determining that no priority mobile stations are registered in the wireless communication network; and
   ceasing broadcast of the identification of the priority control channel.

8. The method of claim 1, further comprising the act of:
   determining that a primary control channel is congested, wherein the priority control channel is established only when it is determined that the primary control channel is congested and the priority mobile station is registered in the wireless communication network.

9. The method of claim 1, wherein wireless communication network operates according to a Code Division Multiple Access air-interface protocol, and the identification of the priority control channel is an identification of a spreading code.

10. The method of claim 1, wherein the identification of the priority control channel is an identification of a frequency.

11. A method for wireless communications, the method comprising the acts of:
    monitoring, by a priority mobile station, a first control channel;
    determining that the first control channel indicates availability of a priority control channel;
    monitoring the priority control channel, wherein the priority control channel includes an uplink access control channel and a downlink control channel; and transmitting a call request over a priority control channel when the first control channel indicates availability of the priority control channel,
wherein the priority control channel is separate and distinct from the first control channel.

12. The method of claim 11, wherein the act of determining comprises the act of:
identifying an identifier associated with the priority mobile station and an identifier of the priority control channel in a message broadcast in the first control channel.

13. The method of claim 11, wherein the call request is transmitted according to a slotted ALOHA transmission scheme.

14. The method of claim 11, wherein the call request is a dispatch call request.

15. The method of claim 11, wherein the call request is a interconnect call request.

16. The method of claim 11, wherein the call request is a packet data communication request.

17. The method of claim 11, further comprising the act of:
registering, by the mobile station, with a wireless communication network, wherein the registration includes an identification that the mobile station is a priority mobile station.

18. A method for providing priority access to a wireless communication network, the method comprising the acts of:
broadcasting information over a primary and secondary downlink control channel;
receiving call requests over a primary uplink control channel associated with the primary downlink control channel;
receiving call requests over a secondary uplink control channel associated with the secondary downlink control channel; and
receiving call requests over an uplink priority control channel,
wherein the uplink priority control channel is a separate and distinct control channel from the primary and secondary uplink control channels.

19. The method of claim 18, further comprising the act of:
broadcasting information over a downlink priority control channel associated with the uplink priority control channel;
broadcasting an identification of the uplink priority control channel.

20. The method of claim 18, wherein the information broadcast over the primary downlink control channel includes an identification of the uplink priority control channel.

21. The method of claim 19, wherein a mobile station monitors the primary, secondary and priority downlink control channels.

* * * * *